United States Patent
Huang et al.

(10) Patent No.: US 6,246,790 B1
(45) Date of Patent: Jun. 12, 2001

(54) IMAGE INDEXING USING COLOR CORRELOGRAMS

(75) Inventors: Jing Huang, Ossining, NY (US); Shanmugasundaram Ravi Kumar, San Jose, CA (US); Mandar Mitra, Calcutta (IN); Wei-Jing Zhu, Ossining, NY (US)

(73) Assignee: Cornell Research Foundation, Inc., Ithaca, NY (US)

( * ) Notice: Subject to any disclaimer, the term of this patent is extended or adjusted under 35 U.S.C. 154(b) by 0 days.

(21) Appl. No.: 09/221,472

(22) Filed: Dec. 28, 1998

Related U.S. Application Data

(60) Provisional application No. 60/068,915, filed on Dec. 29, 1997, and provisional application No. 60/089,684, filed on Jun. 17, 1998.

(51) Int. Cl.[7] .................................................... G06K 9/00
(52) U.S. Cl. ............................................ 382/162; 382/165
(58) Field of Search ................................... 382/162, 163, 382/164, 165, 166, 167, 168, 169, 170, 171, 172, 173, 232, 233, 234, 235, 236

(56) References Cited

U.S. PATENT DOCUMENTS

| | | | |
|---|---|---|---|
| 4,962,540 | 10/1990 | Tsujiuchi et al. | 382/17 |
| 4,979,225 | 12/1990 | Tsujiuchi et al. | 382/17 |
| 4,998,286 | 3/1991 | Tsujiuchi et al. | 382/34 |
| 5,105,466 | 4/1992 | Tsujiuchi et al. | 382/1 |
| 5,208,911 * | 5/1993 | Newman et al. | 395/162 |
| 5,247,583 | 9/1993 | Kato et al. | 382/9 |
| 5,343,538 | 8/1994 | Kasdan | 382/18 |
| 5,363,454 | 11/1994 | Udagawa et al. | 382/17 |
| 5,420,979 * | 5/1995 | Madden et al. | 395/162 |
| 5,430,690 * | 7/1995 | Abel | 367/135 |
| 5,432,906 * | 7/1995 | Newman et al. | 395/162 |
| 5,537,488 | 7/1996 | Menon et al. | 382/170 |
| 5,565,962 | 10/1996 | Yoshimoto | 355/201 |
| 5,583,614 | 12/1996 | Hasuo et al. | 355/201 |
| 5,586,197 | 12/1996 | Tsujimura et al. | 382/162 |
| 5,608,820 | 3/1997 | Vaidyanathan | 382/169 |
| 5,630,037 | 5/1997 | Schindler | 395/131 |
| 5,633,952 | 5/1997 | Outa et al. | 382/165 |
| 5,644,765 | 7/1997 | Shimura et al. | 395/615 |
| 5,652,881 | 7/1997 | Takahashi et al. | 395/615 |
| 5,689,575 | 11/1997 | Sako et al. | 382/118 |
| 5,828,779 | 10/1998 | Maggioni | 383/165 |
| 5,845,009 | 12/1998 | Marks et al. | 382/228 |
| 6,043,909 * | 3/2000 | Holub | 358/504 |

\* cited by examiner

Primary Examiner—Bijan Tadayon
Assistant Examiner—Amir Alavi
(74) Attorney, Agent, or Firm—Perkins, Smith & Cohen, LLP; Jacob N. Erlich; Jerry Cohen

(57) ABSTRACT

A color correlogram is a three-dimensional table indexed by color and distance between pixels which expresses how the spatial correlation of color changes with distance in a stored image. The color correlogram may be used to distinguish an image from other images in a database. To create a color correlogram, the colors in the image are quantized into m color values, $c_i \ldots c_m$. Also, the distance values $k\epsilon[d]$ to be used in the correlogram are determined where $[d]$ is the set of distances between pixels in the image, and where dmax is the maximum distance measurement between pixels in the image. Each entry (i, j, k) in the table is the probability of finding a pixel of color $c_j$ at a selected distance k from a pixel of color $c_i$. A color autocorrelogram, which is a restricted version of the color correlogram that considers color pairs of the form (i,i) only, may also be used to identify an image.

18 Claims, 4 Drawing Sheets

IMAGE INDEXING USING COLOR CORRELOGRAMS

CROSS-REFERENCE TO RELATED APPLICATIONS

This application claims priority of U.S. provisional applications Ser. No. 60/068,915 entitled, "Technique for Image Subregion Querying" filed Dec. 29, 1997 by the present applicants, and Ser. No. 60/089,684, entitled "Image Indexing Using Color Correlograms" filed Jun. 17, 1998 by the present applicants.

This application is also related to co-pending application Ser. No. 09/221,473, filed Dec. 28, 1998 entitled, "Image Subregion Querying Using Color Correlograms" by the present applicants.

STATEMENT OF GOVERNMENT INTEREST

This invention was partially funded by the Government under a grant from DARPA/ARL, ONR Young Investigator Award N00014-93-1-0590, NSF grants DMI-91157199 and IRI 93-00124, career grant CCR-9624552, and DOE grant DEFG02-89ER45405. The Government has certain rights in portions of the invention.

FIELD OF THE INVENTION

This invention relates generally to data management and more particularly to retrieving images using color correlograms.

BACKGROUND OF THE INVENTION

With the rapid proliferation of the Internet and the World Wide Web, the amount of digital image data accessible to users has grown enormously. Image databases are becoming larger and more widespread, and there is a growing need for effective and efficient image retrieval systems. That is, systems that extract from a large collection of images ones that are "similar" to an image of interest to the user. Most existing image retrieval systems adopt the following two-step approach to search image databases: (i) indexing: for each image in the database, a feature vector capturing certain essential properties of the image is computed and stored in a featurebase, and (ii) searching: given a query image, its feature vector is computed, compared to the feature vectors in the featurebase, and images most similar to the query image are returned to the user.

For a retrieval system to be successful, the feature defined for an image should have certain desirable qualities: (i) the difference between pre-selected features of two images should be large if and only if the images are not "similar", (ii) the feature should be fast to compute, and (iii) the size of the feature should be small.

Color histograms are commonly used as feature vectors for images. Though the histogram is easy to compute and seemingly effective, it is liable to cause false positive matches, especially where databases are large, and is not robust to large appearance changes. Recently, several approaches have attempted to improve upon the histogram by incorporating spatial information with color. Many of these methods are still unable to handle large changes in appearance. For instance, the color coherence vector (CCV) method uses the image feature(s), e.g. spatial coherence of colors and pixel position, to refine the histogram. These additional features improve performance, but also require increased storage and computation time.

It remains desirable to have an efficient and accurate means of identifying and retrieving images which allows for changes in the appearance of the image content such as viewing angle and magnification.

It is an object of the present invention to provide a method and apparatus to perform efficient image comparisons.

It is another object of the present invention to provide a method and apparatus to provide a method and apparatus to perform image comparisons which allow for significant changes in the image such as viewing position, background, lighting, and focus.

It is another object of the present invention to provide a method and apparatus which enables efficient image retrieval from a database.

SUMMARY OF THE INVENTION

The problems of image retrieval are solved by the present invention of providing and using a color correlogram. The color correlogram of the present invention is a three-dimensional representation indexed by color pairs and distance between pixels which expresses how the spatial correlation of color changes with distance in a stored image. The color correlogram includes spatial correlation of colors, combines both the global and local distributions of colors, is easy to compute, and is small from a data storage perspective. The color correlogram is robust in tolerating large changes in the appearance of a scene caused by changes in viewing positions, changes in the background scene, partial occlusions, and magnification that causes radical changes in shape.

To create a color correlogram, the colors in the image are quantized into m color values, $c_1 \ldots c_m$. Also, the distance values $D \subseteq [d]$ to be used in the correlogram are determined where $[d]$ is the set of distances between pixels in the image, and where dmax is the maximum distance measurement between pixels in the image. Each entry (i, j, k) in a table, which can be used to define or represent the color correlogram, is the probability of finding a pixel of color $c_j$ at a selected distance k from a pixel of color $c_i$.

A color autocorrelogram is a restricted version of the color correlogram that considers color pairs of the form (i,i) only.

Any norm for comparing vectors, for example the standard $L_1$ norm may be used to compare color correlograms/color autocorrelograms.

Experimental evidence shows that the color correlogram outperforms not only color histograms but also more recent histogram refinements such as the color coherence vector method for image indexing and retrieval.

The present invention together with the above and other advantages may best be understood from the following detailed description of the embodiments of the invention illustrated in the drawings, wherein:

DETAILED DESCRIPTION OF PREFERRED EMBODIMENTS

Figure 1:
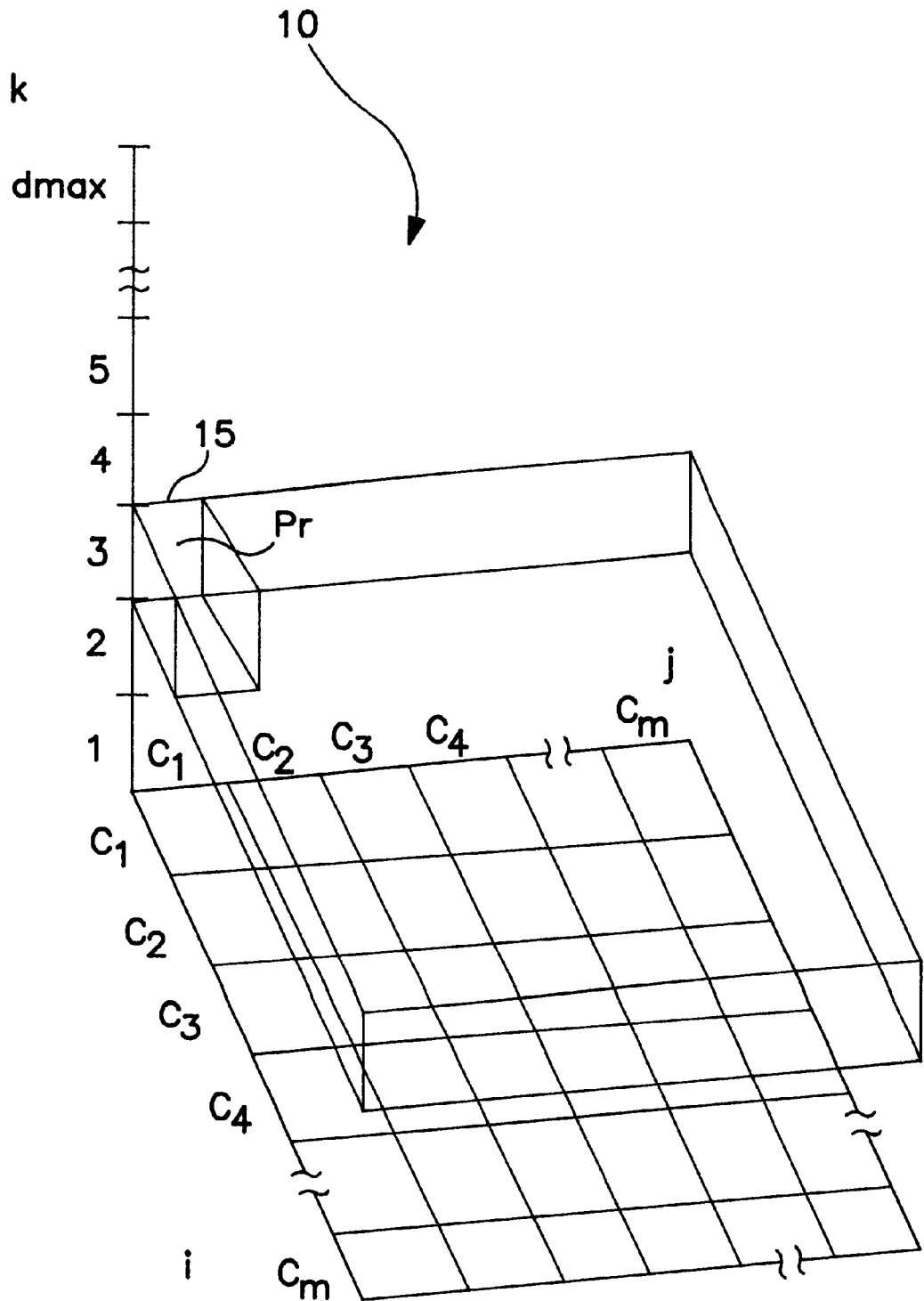
FIG. 1 is a graphic representation of a color correlogram according to principles of the invention.

FIG. 1 illustrates a graphic representation of the color correlogram 10 of the present invention. The color correlogram 10 is a three-dimensional table indexed by color value i, color value j, and by distance k between pixels in an image. The color correlogram 10 expresses how the spatial correlation of color changes with distance in the image.

The spatial correlation of color in a particular image is a feature which may be used to distinguish the image from other images. Putting the spatial correlation of colors data into the format of the color correlogram creates a data object associated with the image which may be stored in a database and subsequently queried. The color correlogram embodies color characteristics of an image in a way which distinguishes the image from other images while tolerating large changes in appearance of the image content due to changes in, but not limited to, viewing positions, background scene, partial occlusions, and camera zoom that causes radical changes in shape. In sum, the color correlogram of this invention includes spatial correlation of colors, combines both the global and local distributions of colors, is easy to compute, and is small from a data storage perspective.

Figure 2:
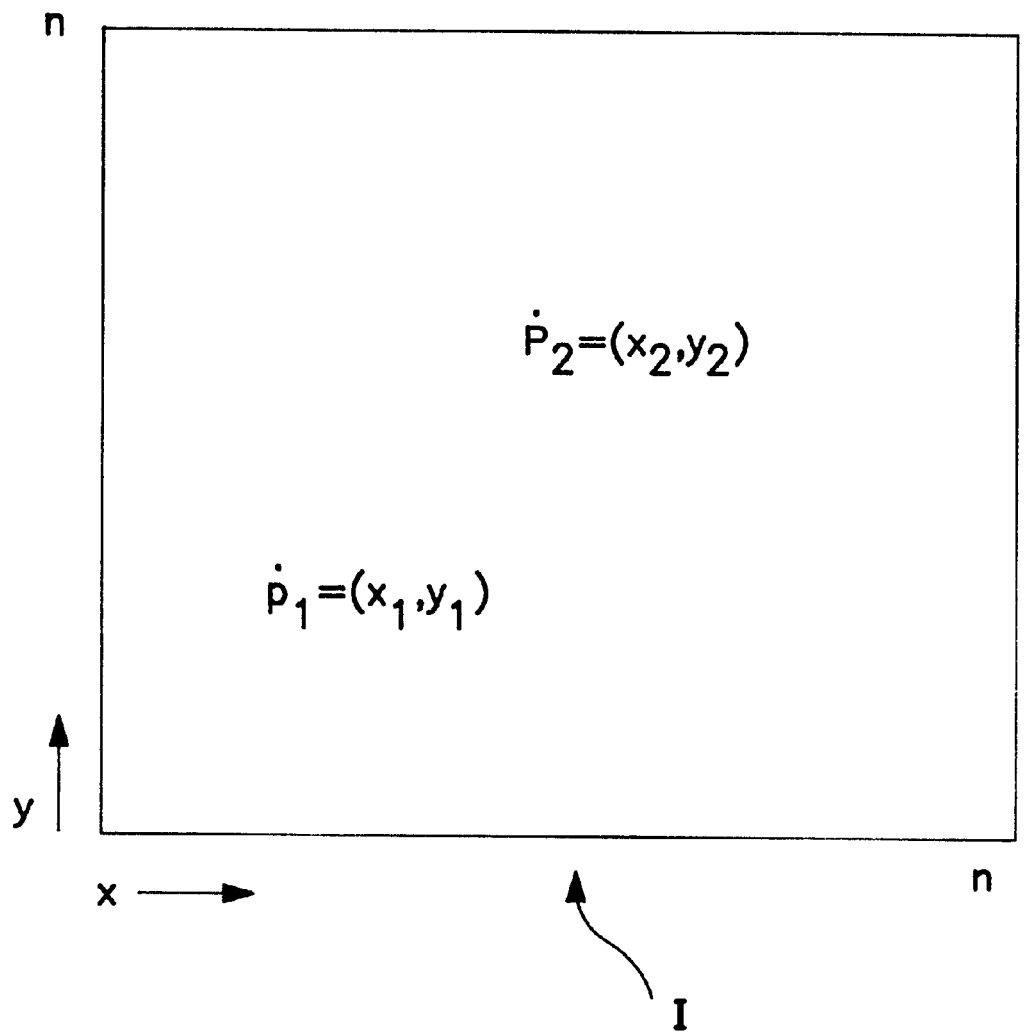
FIG. 2 is an image I.

To create a color correlogram as defined in this invention, the colors in the image are quantized into m color values, $c_1 \ldots c_m$. Also, the distance values $D \subseteq [d]$ to be used in the correlogram are determined where $[d]$ is the set of distances between pixels in the image, and where dmax is the maximum distance measurement between pixels in the image. In FIG. 2, an image I, for example, is an n×n matrix (square for the sake of simplicity). The distance between pixels $p_1$ and $p_2$, where $p_1=(x1, y_1)$ and $p_2=(x_2, y_2)$, is $$|p_1-p_2|=\max\{|x_1-x_2|, |y_1-y_2|\} \quad (1).$$

The image I has a set of values of distances between pixels [d], the maximum value of d being the largest distance between pixels in the image.

The color values and distances are used to index the correlogram as shown in FIG. 1. The value in each entry ($c_i$, $c_j$, k) of the correlogram 10, such as the entry ($c_1$, $c_1$, 3) 15, is the probability Pr of finding a pixel of a color value $c_j$ at a distance k away from a pixel of color value $c_i$.

A color autocorrelogram may also be used with the concepts of this invention to distinguish an image from other images. The color autocorrelogram is a restricted version of the color correlogram that considers only same-color pairs, that is color values of the form ($c_i$, $c_i$).

A banded color correlogram is a restricted version of the color correlogram in which, for each color pair, the probability values for the distances in the selected distance set are summed and entered into the banded correlogram as a single number. Similarly, the banded autocorrelogram is a further restricted corellogram in which, for same-color pairs only, the probability values for the distances in the selected distance set are summed up and entered into the banded autocorrelogram as a single number.

An edge correlogram is a generalized version of the color correlogram in which each color is further segmented into an edge color and a non-edge color. The color of each pixel is now either an edge color or a non-edge color based on whether the pixel is part of an edge in the image or not. Existing methods may be used to determine if a particular pixel is part of the edge of an image.

A comprehensive correlogram identification of the image I involves calculating correlograms from a number of distances k from the set [d] for all of the quantized color pairs ($c_i$, $c_j$). Experimental evidence has indicated, however, that only the autocorrelogram, which uses same color-value color-pairs, and a few values of k are needed to produce a useful image identifier.

Figure 3:
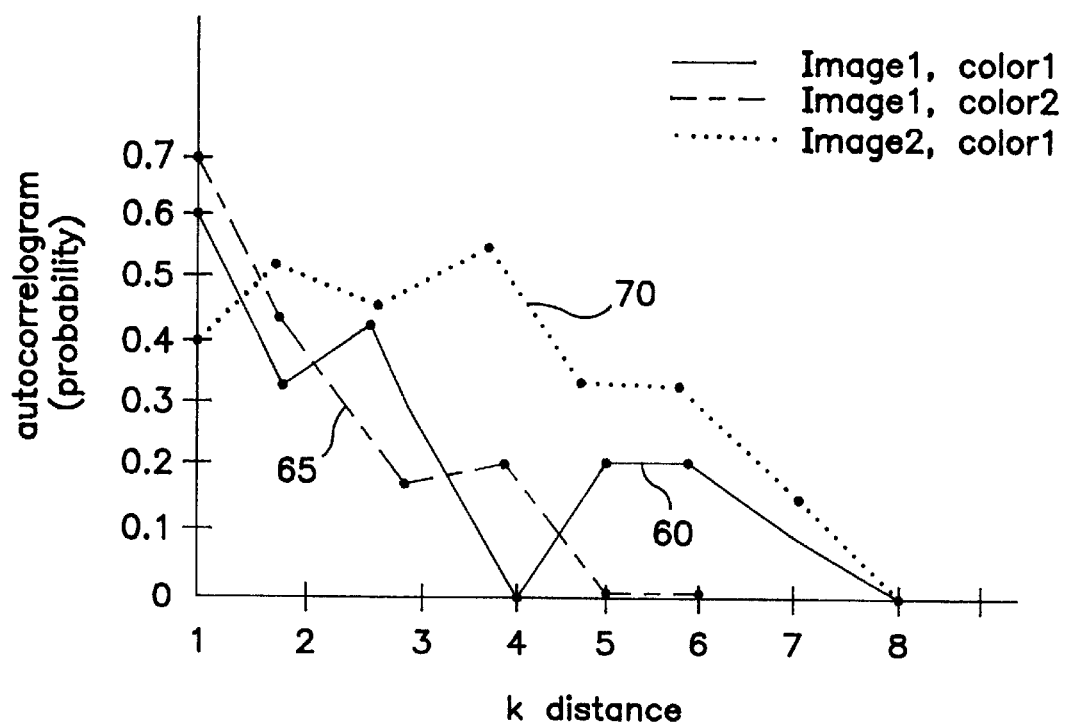
FIG. 3 is a graphical representation of a plurality of autocorrelograms according to principles of the present invention; and, FIG. 4 is a flow chart of the process of retrieving from a database images matching a query image using the color correlogram according to principles of the present invention.

The simplified nature of the autocorrelogram facilitates a two-dimensional representation which is shown graphically in FIG. 3. FIG. 3 shows several example autocorrelograms where probability is plotted against distance k. The solid line 60 in the graph is representative of the autocorrelogram for a first color value in a first exemplary image. The dot-dash line 65 in the graph yields the autocorrelogram for a second color in the first exemplary image. The dotted line 70 in the graph gives the autocorrelogram for the first color in a second exemplary image. The images are identifiable from their autocorrelogram and may be compared using their autocorrelograms.

The straightforward method for calculating the color correlogram of the present invention, is to take a first pixel of the color $c_i$ in the image I, and for each selected k in the set of [d], to count all pixels of color $c_j$ which are k distance away from the first pixel. This process is repeated for each pixel in the image over all of the selected values k in the set of [d]. This method takes a long time.

To reduce the time of the correlogram calculation, the following algorithm is used.

First, $I_c$ is defined as an n×n 0–1 matrix such that $$I_c(p) = 1 \Leftrightarrow I(p) = c.$$

This quantity represents those pixels in the image of color c. Then the following quantities are defined:

$$\lambda_{(x,y)}^{c,h}(k) \vcentcolon= |\{(x+i, y) \ni I_c \mid 0 \le i \le k\}| \quad (2)$$

$$\lambda_{(x,y)}^{c,v}(k) \vcentcolon= |\{(x, y+i) \ni I_c \mid 0 \le j \le k\}| \quad (3)$$

These quantities count the number of pixels of a given color c within a given distance k from a fixed pixel (x,y) in the positive horizontal and vertical directions.

These expressions, equations 2 and 3, represent a restricted count of the number of pixels of a particular color within a specified distance k from a selected pixel in the positive horizontal and vertical directions instead of all the pixels in a radius around the first pixel as described above.

The method of calculating the color correlogram works by first computing $$\lambda_p^{c_j,v}$$

and $$\lambda_p^{c_j,h}$$

where pixel p=(x,y).

$$\lambda_{(x,y)}^{c,h}(k) = \lambda_{(x,y)}^{c,h}(k-1) + \lambda_{(x+k,y)}^{c,h}(0) \quad (4)$$

with the initial condition $$\lambda_p^{c_j,h}(0) = 1 \text{ if } p \in I_c$$

and for each k=1 . . . d using equation 4.

In a similar manner $$\lambda_p^{c,v}$$

can also be efficiently computed.

The modulo boundaries are defined as follows:

$$\Lambda_{(c_i,c_j)}^{k(i)} = \sum_{(x,y)} \left( \lambda_{(x-k,y-k+1)}^{c_j,v}(2k-2) + \lambda_{(x-k,y-k)}^{c_j,h}(2k) + \lambda_{(x-k,y+k)}^{c_j,h}(2k) + \lambda_{(x+k,y-k+1)}^{c_j,v}(2k-2) \right) \quad (5)$$

from which the correlogram entry for ($c_i$, $c_j$, k) can be computed as $$\Lambda_{(c_i,c_j)}^{k(i)} \div (8k \cdot H_{c_i}(i)) \text{ where } H_{c_i}$$

is the number of pixels of color $c_i$ in the image.

As stated above, the color correlogram and the autocorrelogram may be stored in a database and queried in order to identify matching images.

Figure 4:
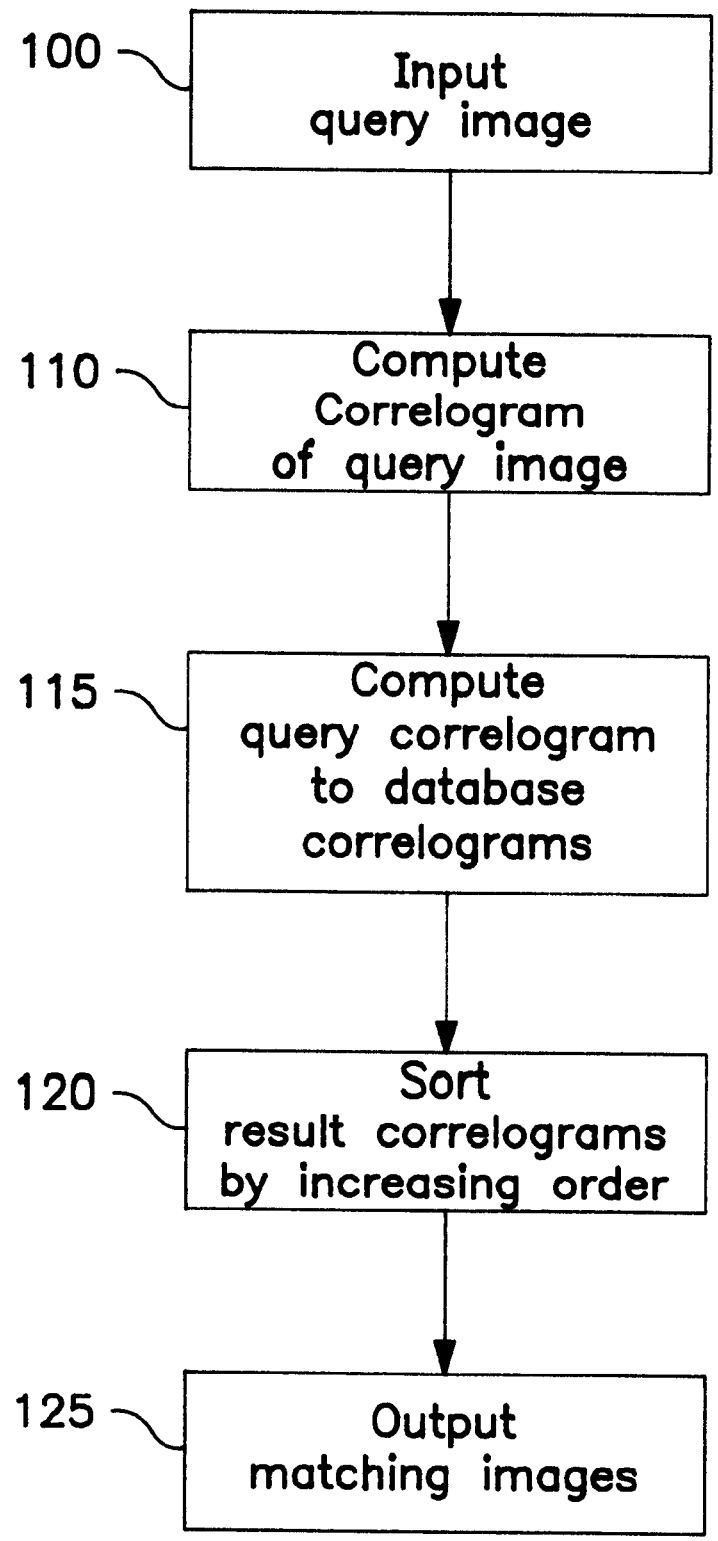

FIG. 4 shows a flow chart of the method of this invention of image retrieval from a database using color correlograms. First, an input query image is provided, block 100. The correlogram of the input query image is computed using one of the methods described above, depending on the type of correlograms stored in the database, block 110. Then the correlogram of the input query image is compared to the correlograms stored in the database, block 115. The standard $L_1$ norm is used to compare color correlograms and color autocorrelograms. The $L_1$ distance, commonly used to compare vectors, is the sum of absolute differences of the components of the vectors being compared. The relative difference between two numbers x and y is given by the expression $|x-y|/(1+x+y)$. The relative distance measure calculates the sum of the relative differences of the components of the vectors and in most cases performs better than the absolute measure. The resulting distances are sorted by increasing order, block 120. Generally, a number of top matches is pre-selected and this number of images are presented as an output of images matching the query image, block 125.

Experiments have been performed substantiating the methodology of the present invention using a large database of 14,554 images and comparing the color correlogram to the histogram and CCV using objective criteria. To compromise between quality and space and time requirements, a subset of [d]={1, . . . ,d} is chosen and the color autocorrelogram for these values is computed. The color autocorrelograms of this invention provided good results. A set of 77 query images, each with a unique correct answer, was run on the database. The results confirmed that on an average, the user has to examine only the top three image retrieved by the system to find the image that is the answer. For a set of queries for which there were multiple correct answers in the database, the color autocorrelogram performed better than all other methods.

Though the experiments disclosed above are search-by-example experiments, the autocorrelogram may also, within the scope of this invention, be expanded for use in target searching and open-ended browsing. Correlograms are also applied to other vision problems such as detecting cuts in a motion sequence.

It is to be understood that the above-described embodiments are simply illustrative of the principles of the invention. Various and other modifications and changes may be made by those skilled in the art which will embody the principles of the invention and fall within the spirit and scope thereof.

What is claimed is:

1. A computer-implemented method for indexing images, comprising the steps of:

quantizing colors into color values in an image having a plurality of pixels;

selecting a distance value to be used as the distance between pixels to be evaluated for color value;

analyzing said image according to said color values and said selected distance value;

determining in response to the analyzing step a probability of finding a pixel of a particular color value at said distance value from a selected pixel of a selected color value; and entering said probability into a color correlogram whereby the image is represented by the color correlogram for the purpose of indexing the image.

2. The method of claim 1 wherein said analyzing step further comprises the step of counting all the pixels at said distance value in a radius of said selected distance value around said selected pixel.

3. The method of claim 1 wherein said analyzing step comprises the step of counting the number of pixels in a positive horizontal and vertical direction at a distance equal to said selected distance value from said selected pixel.

4. The method of claim 1 wherein said particular color value and said selected color value are the same.

5. The method of claim 1 further comprising the steps of:

selecting a plurality of distance values; and performing said analyzing step, said determining step, and said entering step using said plurality of distance values.

6. The method of claim 5 wherein the provided corellogram is a banded correlogram and the method further comprises the steps of:

summing, for each color pair, the probability values obtained using the plurality of distance values to obtain a probability sum for each color pair; and, entering the probability sum into the banded correlogram.

7. The method of claim 6 wherein the particular color value and the selected color value of each said color pair are the same.

8. The method of claim 1 wherein the provided correlogram is an edge correlogram and the method further comprises the steps of:

segmenting the color values into edge color values and non-edge color values; and, determining whether a particular pixel is part of an edge.

9. The method of claim 1 further comprising the steps of:

storing said color correlogram in a database.

10. The method of claim 9 further comprising the steps of:

determining a query color correlogram of a query image; and comparing the query color correlogram with stored color correlograms in the database to determine a similarity between a stored image and the query image.

11. The method of claim 10 further comprising the step of presenting, as a result of said comparing step, a plurality of stored images which are determined to be similar to said query image.

12. A system for indexing images, comprising:

means for quantizing colors into color values in an image having a plurality of pixels;

means for selecting a distance value to be used as the distance between pixels to be evaluated for color value;

means for analyzing said image according to said color values and said distance value;

means for determining, in response to said analyzing means, a probability of finding a pixel of a particular color value at said distance value from a selected pixel of a selected color value; and means for entering the probability into a color correlogram, whereby the image is represented by the color correlogram for the purpose of indexing the image.

13. The system for indexing images of claim 12 wherein said means for analyzing further comprises a means for counting all the pixels at said distance value in a radius of said selected distance value around said selected pixel.

14. The system for indexing images of claim 12 wherein said means for analyzing further comprises a means for counting the number of pixels in a positive horizontal and vertical direction at a distance equal to said selected distance value from said selected pixel.

15. The system for indexing images of claim 12 wherein said particular color value and said selected color value are the same.

16. The system for indexing images of claim 12 further comprising:

means for selecting a plurality of distance values;

means for analyzing said image according to said color values and said plurality of distance values; and means for determining, in response to said analyzing means, a probability of finding a pixel of a particular color value for each of said plurality of distance values from a selected pixel of a selected color value.

17. The system for indexing images of claim 12 further comprising:

a database for storing said correlogram.

18. The system for indexing images of claim 17 further comprising:

means for determining a query color correlogram of a query image; and means for comparing the query color correlogram with stored color correlograms in the database to determine a similarity between a stored image and the query image.

* * * * *